United States Patent
Gallotto

(10) Patent No.: US 10,029,853 B2
(45) Date of Patent: Jul. 24, 2018

(54) CONVEYOR BELT WITH DUAL COEFFICIENT OF FRICTION

(71) Applicant: CHIORINO S.p.A., Biella (IT)

(72) Inventor: Enrico Gallotto, Cossato (IT)

(73) Assignee: CHIORINO S.P.A., Biella (IT)

(*) Notice: Subject to any disclaimer, the term of this patent is extended or adjusted under 35 U.S.C. 154(b) by 0 days.

(21) Appl. No.: 15/485,755

(22) Filed: Apr. 12, 2017

(65) Prior Publication Data
US 2017/0297823 A1    Oct. 19, 2017

(30) Foreign Application Priority Data
Apr. 18, 2016    (IT) .................. 102016000039718

(51) Int. Cl.
*B65G 15/30*     (2006.01)
*B65G 17/00*     (2006.01)

(52) U.S. Cl.
CPC .................. *B65G 15/30* (2013.01)

(58) Field of Classification Search
CPC .................. B65G 15/30; B65G 17/00
USPC ............................... 198/846, 844.2
See application file for complete search history.

(56) References Cited

U.S. PATENT DOCUMENTS 5,377,819 A * 1/1995 Horton .................. B65G 17/08
                                                       198/850
6,220,426 B1   4/2001 Giana
6,484,872 B1  11/2002 Jepsen et al.

FOREIGN PATENT DOCUMENTS

JP   S58109746 A   6/1983
JP   S60195845 A   12/1985
JP   H09286512 A   11/1997

OTHER PUBLICATIONS

Italian Search Report and Written Opinion dated Jan. 10, 2017 for Application No. UA20162687.

* cited by examiner

*Primary Examiner* — Gene O Crawford
*Assistant Examiner* — Lester III Rushin
(74) *Attorney, Agent, or Firm* — Patterson & Sheridan, LLP

(57) ABSTRACT

A conveyor belt comprising a first longitudinal belt portion and a second longitudinal belt portion having respective transport surfaces with coefficients of friction different from each other.

6 Claims, 3 Drawing Sheets

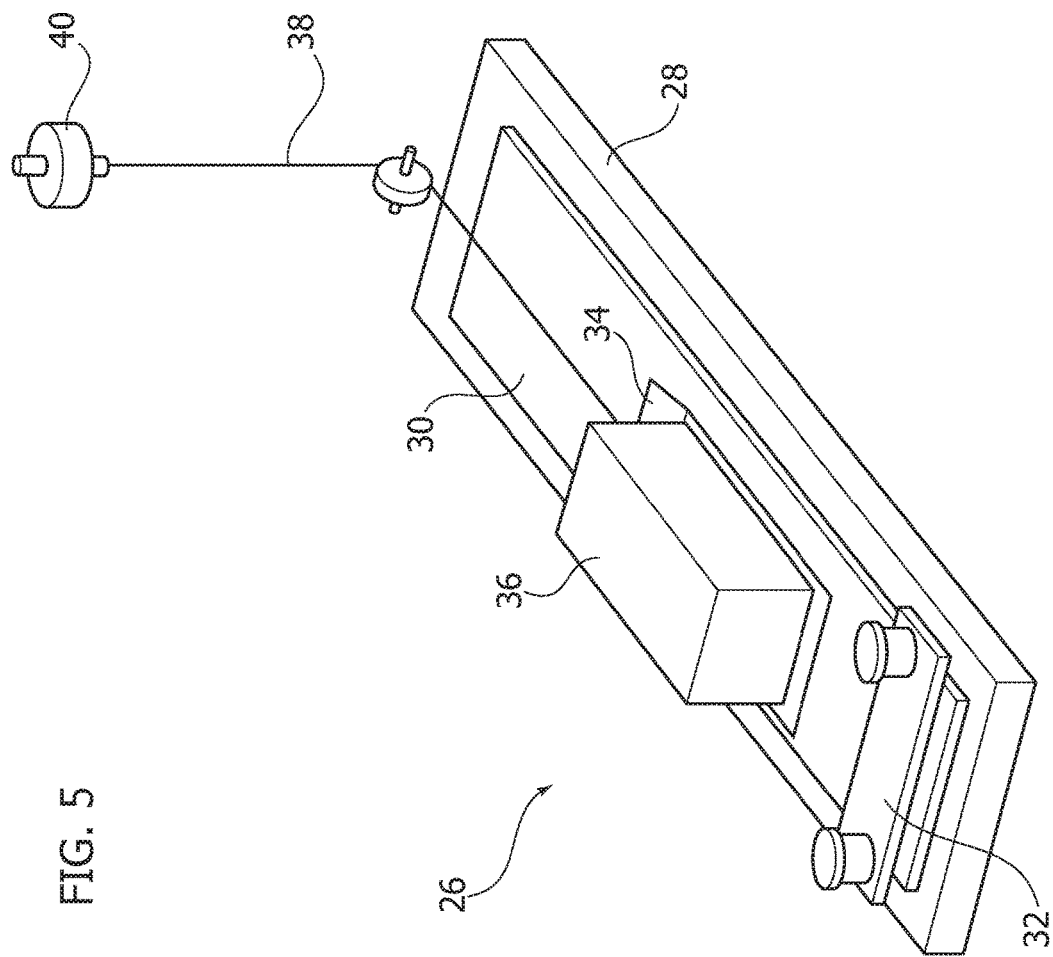

CONVEYOR BELT WITH DUAL COEFFICIENT OF FRICTION

CROSS-REFERENCE TO RELATED APPLICATIONS

This application claims benefit of Italian patent application number 102016000039718, filed Apr. 18, 2016, which is herein incorporated by reference.

BACKGROUND OF THE INVENTION

Field of the Invention

The present invention relates to a conveyor belt, intended, in particular, to be used as a receiving belt in sorting plants of packages.

Description of Prior Art

In sorting plants of packages, a typical layout envisages that the packages coming from a feed belt are launched onto a receiving belt. Typically, the receiving belt is inclined with respect to the feed belt, so that the packages are launched onto the receiving belt along a direction that is inclined with respect to the longitudinal direction of the receiving belt. Due to the high speed with which the packages are normally launched onto the receiving belt, if the coefficient of friction of the receiving belt is low, the packages frequently collide against the edge of the receiving belt opposite the feed side, with the consequent risk of damage of the packages. If instead the coefficient of friction of the receiving belt is high, the parcels tend to overturn instead of sliding on the surface of the receiving belt, at the moment of contact with the transport surface of the receiving belt. Once again, there is a risk of damage to the packages.

SUMMARY OF THE INVENTION

The present invention aims to provide a conveyor belt that overcomes the problems of the prior art.

According to the present invention, this object is achieved by a conveyor belt having a first longitudinal belt portion and a second longitudinal belt portion having respective transport surfaces with coefficients of friction different from each other.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein:

FIG. 5 is a schematic view illustrating an apparatus for measuring the coefficient of friction.

DETAILED DESCRIPTION

Figure 1:
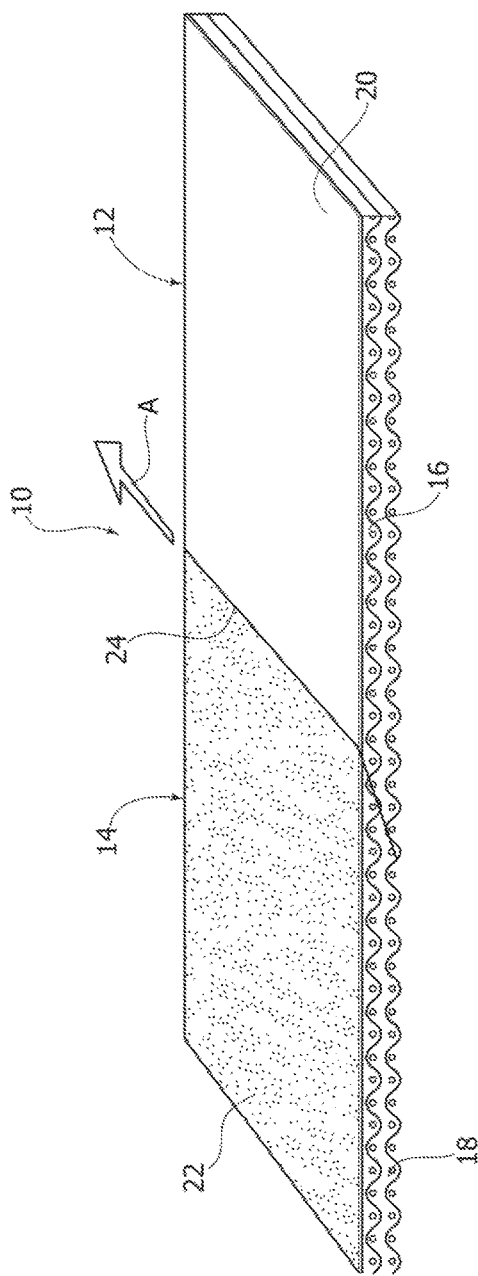
FIG. 1 is a schematic perspective view of a first embodiment of a conveyor belt according to the present invention.

With reference to FIG. 1, numeral 10 indicates a conveyor belt according to an embodiment of the present invention.

The conveyor belt 10 comprises a first longitudinal belt portion 12 and a second longitudinal belt portion 14 joined to each other in a longitudinal direction A.

The two longitudinal belt portions 12, 14 comprise respective traction layers 16, 18 and respective coatings. The coatings form respective planar transport surfaces 20, 22.

The traction layers 16, 18 are composed of fabrics, typically polyester, cotton, polyamide, aramid fiber, etc.

The coatings have chemical and physical characteristics suitable for the application field of the belts. The most widely used materials for the coatings are: thermoplastics (polyolefin, TPU, PVC, etc.), elastomeric materials (natural or synthetic rubber, silicone, etc.), and highly cross-linking materials (for example PUR). The coatings are typically applied onto the fabric 16, 18 constituting the traction layer, by means of coating, calendering or vulcanization.

The two longitudinal belt portions 12, 14 are produced separately from each other according to conventional techniques in the field of production of conveyor belts and are joined together along a longitudinal junction region 24.

The two longitudinal belt portions 12, 14 have coatings with transport surfaces 20, 22 with different coefficients of friction. Preferably, the two longitudinal belt portions 12, 14 have the same textile structure 16, 18 in order to avoid alignment problems and deflections.

Figure 3:
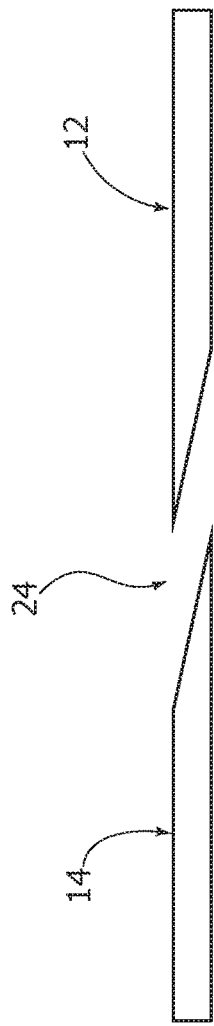
FIGS. 3 and 4 are schematic details illustrating two examples of the junction regions.

In the example illustrated in FIG. 1, the longitudinal junction 24 is obtained by means of gluing. The contiguous longitudinal edges of the two longitudinal belt portions 12, 14 are beveled beforehand as illustrated in FIG. 3 by means of suitable beveling machines. Then, layers of glue are applied on the inclined edges and the two edges are pressed in a press with variable values of pressure, time and temperature, as a function of the materials.

Figure 2:
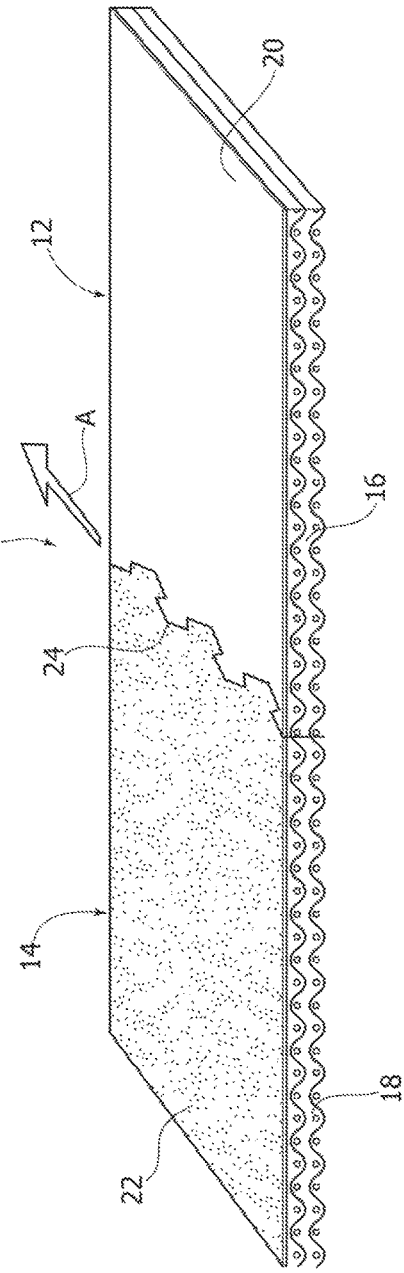
FIG. 2 is a schematic perspective view of a second embodiment of a conveyor belt according to the present invention.
Figure 4:
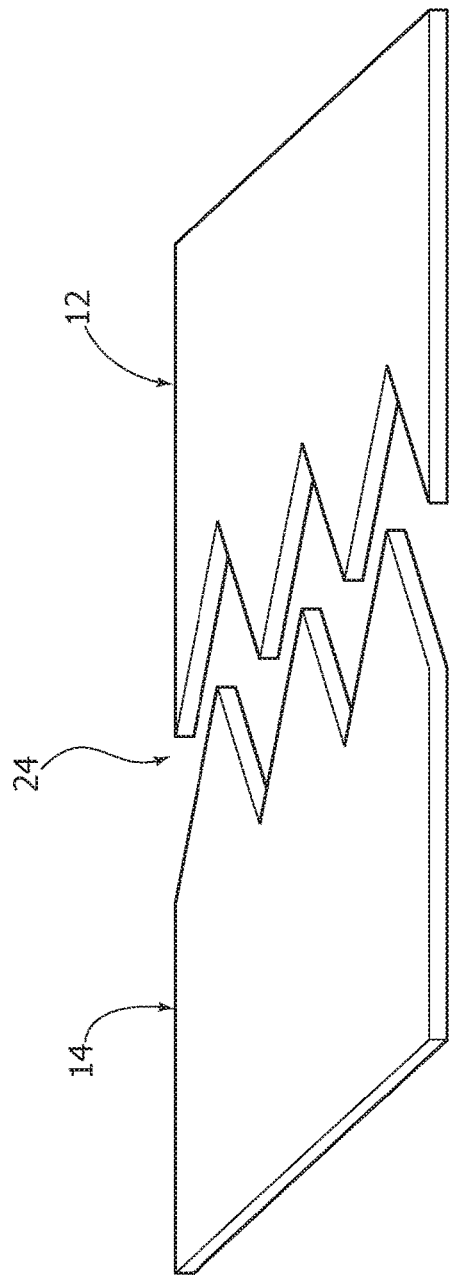

In the embodiment illustrated in FIG. 2, the longitudinal junction 24 is obtained by means of an interlocking thermoplastic junction. The contiguous longitudinal edges of the two longitudinal belt portions 12, 14 are cut with complementary profiles beforehand, by means of suitable diecutters. In FIG. 2, the edges are cut according to Q-shaped profiles. In the example illustrated in FIG. 4, the edges are cut according to V-shaped profiles. The contiguous edges are interlocked with each other and are subjected to thermoplastic welding in a press, with variable values of temperature, pressure and time, as a function of the materials.

After the longitudinal junction, the two longitudinal belt portions 12, 14 form a single conveyor belt 10, having two longitudinal strips with different coefficients of friction. The conveyor belt 10 is then joined in the transverse direction to form a closed-loop conveyor belt, configured to be mounted on two pulleys or rollers with parallel axes.

The reference standard for measuring the coefficient of friction of the transport surfaces 20, 22 of the longitudinal belt portions 12, 14 is the standard UNI EN ISO 21182, which specifies the test methods to determine the static and dynamic coefficients of friction of the light conveyor belts defined by the standard UNI EN ISO 21183-1.

FIG. 5 schematically shows an apparatus 26 used for measuring the static coefficient of friction according to the standard UNI EN ISO 21182. The apparatus 26 comprises a base 28 on which a test sample 30 is applied, held at one end by a locking element 32. A steel slide 34 rests on the test sample 30. On the slide 34 rests a weight 36. The slide 34 is connected to a wire 38, connected to a load cell 40.

The wire 38 is subjected to an increasing force, as measured by the load cell 40. The static coefficient of friction of the sample 30 on steel is determined as a function of the value of the force at which the slide starts to move.

Between the coefficients of friction of the two longitudinal belt portions 12, 14, there must be a difference sufficient to obtain sliding without tipping of the object deposited on the belt, and the arrest of the objects before they enter into abutment with the opposite edge to the feed side. The different coefficients of friction may be due to different coating materials and/or to a different surface finish of the transport surfaces 20, 22.

According to a preferred aspect of the present invention, the static coefficient of friction on steel of the first longitudinal belt portion 12, measured according to the standard UNI EN ISO 21182, is between 0.1 and 1.0 and the second longitudinal belt portion 14 has a static coefficient of friction on steel, measured according to the standard UNI EN ISO 21182, of at least 50% higher compared to the static coefficient of friction of the first longitudinal belt portion 12.

The following table shows, purely by way of example, possible combinations of existing belts produced by the same applicant, with the respective coefficients of friction and the measurement tolerances of the coefficients of friction.

| Chiorino belt codes | Coefficient of friction | Tolerance |
| --- | --- | --- |
| NA-49 2MT5 U0-V3 N | 0.27 | 0.02 |
| NA-1283 2MT5 U0-V5 RT N | 0.81 | 0.04 |
| NA-786 2M5 U0-U2 HP VL blue A | 0.41 | 0.04 |
| NA-1054 2M5 U0-U2 HP blue S A | 0.96 | 0.2 |
| NA-1057 2M5 U0-U0 HP blue A | 0.12 | 0.00 |
| NA-786 2M5 U0-U2 HP VL blue A | 0.41 | 0.04 |
| NA-1057 2M5 U0-U0 HP blue A | 0.12 | 0.00 |
| NA-1054 2M5 U0-U2 HP blue S A | 0.96 | 0.2 |

According to another preferred aspect, the width of the first longitudinal belt portion 12 is at least equal to 60% of the overall width of the conveyor belt 10.

Of course, without prejudice to the principle of the invention, the details of construction and the embodiments can be widely varied with respect to those described and illustrated, without thereby departing from the scope of the invention as defined by the claims that follow.

The invention claimed is:

1. A conveyor belt comprising a first longitudinal belt portion and a second longitudinal belt portion having respective transport surfaces with coefficients of friction different from each other, wherein:

said first longitudinal belt portion has a static coefficient of friction on steel, measured according to the standard UNI EN ISO 21182, between 0.1 and 1.0; and said second longitudinal belt portion has a static coefficient of friction on steel, measured according to the standard UNI EN ISO 21182, which is at least 50% higher than the static coefficient of friction of said first longitudinal belt portion.

2. A conveyor belt according to claim 1, wherein said first longitudinal belt portion and said second longitudinal belt portion are produced separately and are joined together along a longitudinal junction region.

3. A conveyor belt according to claim 1, wherein said first longitudinal belt portion and said second longitudinal belt portion have respective traction layers that are equal to each other.

4. A conveyor belt according to claim 1, wherein the width of said first longitudinal belt portion is at least equal to 60% of the overall width of the conveyor belt.

5. A conveyor belt according to claim 2, wherein said longitudinal junction region is obtained by gluing respective beveled longitudinal edges of said first and second longitudinal belt portions.

6. A conveyor belt according to claim 2, wherein said longitudinal junction region is obtained by thermoplastic welding of respective longitudinal edges of said first and second longitudinal belt portions interlocked with each other.

* * * * *